United States Patent Office

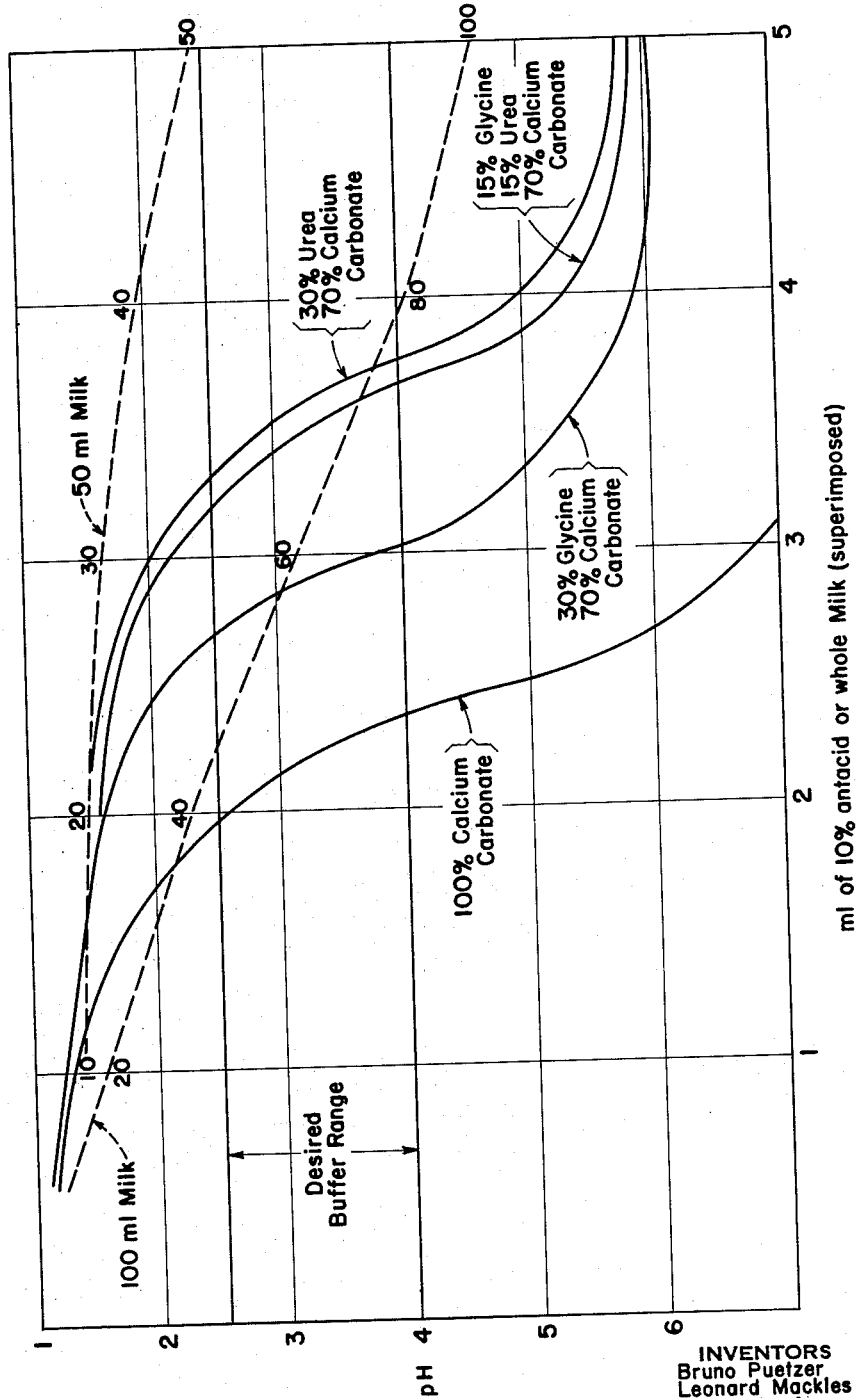

3,164,519
Patented Jan. 5, 1965

3,164,519
ANTACID COMPOSITION AND METHOD
OF USING SAME
Bruno Puetzer, White Plains, Leonard Mackles, New York, and Martin Perl, Brooklyn, N.Y., assignors to Schenley Industries, Inc., New York, N.Y., a corporation of Delaware
Filed Apr. 19, 1962, Ser. No. 188,623
9 Claims. (Cl. 167—55)

This invention relates to novel antacids. More particularly, the present invention relates to novel and improved antacid compositions for use in the treatment of gastric hyperacidity and conditions associated therewith, such as peptic ulcer, duodenal ulcer and the like, in human beings, as well as to processes for making and using these compositions.

It has been suggested heretofore to employ calcium carbonate in antacid compositions. It has also been known to incorporate ingredients such as glycine therein to given an enhanced buffering effect to calcium carbonate antacid compositions; and indeed to render such compositions among the most efficacious of antacids.

It has now been discovered, however, that antacid compositions containing urea in combination with glycine and calcium carbonate, or in combination with calcium carbonate alone are particularly valuable and manifest a significantly enhanced antacid activity over compositions known heretofore for this purpose. Further, the employment of urea serves to obviate the use partially or completely, of glycine, from use with calcium carbonate, thus rendering production of the antacid compositions of the invention substantially more desirable economically.

The compositions of the invention contain at least 15 parts and up to (and including) 40 parts by weight of urea, about 60 to 85 parts by weight of calcium carbonate and from 0 to 15 parts by weight of glycine, the proportion of glycine present being in direct substitution of an equal proportion of the urea or calcium carbonate employed.

Thus, the present invention is intended to encompass an antacid composition containing, as active ingredients, at least 15 percent and up to 40 percent by weight of urea, 60 percent to 85 percent by weight of calcium carbonate and from 0 to 15 percent by weight of glycine. Preferred compositions of the invention occur, in fact, at the opposite ends of this range; and are those having as the active ingredients, 15 parts of urea, 70 parts of calcium carbonate, and 15 parts of glycine or 15 additional parts of urea. Thus, one preferred composition is that in which there is present 15 parts of urea, 15 parts of glycine and 70 parts of calcium carbonate; and the second preferred composition is one containing 30 parts of urea and 70 parts of calcium carbonate. It is noted that the term "parts" as well as percentages and the like employed herein refer to parts and percentages by weight unless otherwise explicitly indicated. The aforesaid compositions are prepared by admixture of the individual components.

The antacids of the invention may be administered in liquid or solid form. The liquid form is, however, normally preferred and thus substantial quantities of water, e.g. deionized water, are usually added to the proportions of active ingredients recited above, e.g. up to 850 or 950 milliliters of water for every 200 grams of the aforesaid active components. For the purpose of rendering the compounds more acceptable to taste, they are usually compounded with flavoring agents as well. The usual unit dosage when taken orally is from 0.5 gram to 2.0 grams of the active antacid components. Somewhat smaller dosages, e.g. 0.25 gram and significantly greater dosages, e.g. 8.0 grams, of the active components may also be ingested with satisfactory therapeutic results.

The following examples are illustrative of compositions incorporating the practice herein described.

EXAMPLE 1

To 850 milliliters of deionized water are added 0.324 gram of saccharin (sodium), 1.0 gram sodium benzoate and 30.0 grams of glycine and 30 grams of urea with agitation until completely dissolved. Sodium carboxymethylcellulose (CMC–7LP, a trade name of Hercules Powder Co.) (30.0 grams) is added slowly to the resulting solution until the solution is completely clear. 10 grams of Veegum HV (Vanderbilt trade name for colloidal magnesium aluminum silicate) is then added with agitation until partially dispersed. The product mixture thus formed is then introduced into a Manton-Gaulin homogenizer for a period of five (5) minutes. Calcium carbonate (140 grams) is added to this mixture and homogenization continued under a pressure of 4000 pounds per square inch (p.s.i.) for 45 minutes. The resulting composition is then removed from the homogenizer and permitted to cool. 0.085 gram of oil of spearmint, U.S.P., 0.17 gram of oil of peppermint, U.S.P. terpeneless) and 1.45 grams of Sorbo (a trade name of Atlas Corp. for a 70 percent sorbital composition) are then added as flavoring ingredients and the mixture brought up to a total volume of 1000 milliliters with deionized water, and the liquid product is once again homogenized under 4000 p.s.i. pressure.

EXAMPLE 2

The following components in the amounts recited were assembled and prepared to provide a liquid antacid composition in the manner described in Example 1.

| Ingredient: | Amount |
|---|---|
| Deionized water _____ ml__ | 850 |
| Saccharin, sodium (Monsanto) _____g__ | 0.4 |
| Sodium benzoate (Merck) _____g__ | 1.0 |
| Urea (Sohio) _____g__ | 60.0 |
| CMC–7LP (Hercules) _____g__ | 30.0 |
| Veegum HV (Vanderbilt) _____g__ | 10.0 |
| Calcium carbonate (Wyandotte, Purecal "O") _____g__ | 140.0 |
| Oil of spearmint, U.S.P. _____g__ | 0.085 |
| Oil of peppermint, U.S.P. (terpeneless) __g__ | 0.17 |
| Sorbo (70% sorbitol) (Atlas) _____g__ | 1.45 |
| Deionized water, q.s. _____ ml__ | 1000 |

The compositions of the invention are particularly valuable due to their ability to effect a buffering action which is steady and sustained within the pH range considered to be most desirable, that is a pH within the range of about 2 to about 6 and preferably within the range of 2.5 to 4. The significant but not unduly rapid onset of the buffering action of these compounds as well as their ability to maintain a pH within or about the aforesaid range is particularly important, in that, while a sustained buffering effect is, of course, desirable to eliminate hyperacidity and the concomitant discomfort and irritation of the gastro-intestinal tract associated therewith; it is also requisite that the digestive processes be not completely inhibited and that the onset be neither at too high a pH nor too rapid, due to the other untoward physiological reactions which may be initiated thereby.

The following table and accompanying drawing illustrate the improved buffering effect of the preferred compositions of the present invention described above with relation to equivalent percentages of calcium carbonate, the glycine-calcium carbonate composition known heretofore and alluded to above, and milk; the latter natural product having survived the tests of many decades in demonstrating its therapeutic usefulness as an antacid; one which is, in fact, ideal in many ways, but the use of which, exclusively, in the treatment of chronic hyperacidity and the like is impractical by virtue of the large amounts required for effective administration. The data indicated in this table and illustrated in the graphs of the drawing were obtained by titration of 0.1 N HCl with each of the antacid compositions indicated.

It will be evident from a study of the table and drawing that both urea and glycine extend the neutralization curve of calcium carbonate so that a greater portion of the curve lies within the titrated values obtained for 50 milliliters and 100 milliliters of whole milk within the most desirable buffer range of pH 2.5 to 4.0 indicated in the drawing by the broken line representation. It will be noted, particularly, that both of the compositions of the invention, the urea-calcium carbonate and urea-glycine-calcium carbonate remain in the desired pH range for a longer period of time and arrive at their maximum buffering action with the most gradual yet consistent and effective onset when compared with the glycine-calcium carbonate mixture.

It should also be noted that the mixture of urea-glycine-calcium carbonate gives a curve by this titration procedure which is not the mean neutralization value between the glycine and urea but evidences a value which is significantly enhanced by the particular combination of urea and glycine with calcium carbonate.

Table

[Titration of 50 ml. of 0.1 N HCl with ml. of 10% Antacid or whole Milk as indicated]

| Formula | A | B | C | D | | |
|---|---|---|---|---|---|---|
| Ml. of 10% Antacid Suspension | Calcium Carbonate (100%) | 30% Urea; 70% Calcium Carbonate | 30% Glycine; 70% Calcium Carbonate | 15% Urea; 15% Glycine; 70% Calcium Carbonate | Whole Milk | |
| | pH | pH | pH | pH | Cc. | pH |
| 0.1 | 1.14 | 1.10 | 1.10 | 1.10 | 1 | 1.10 |
| 0.5 | 1.21 | 1.15 | 1.17 | 1.15 | 5 | 1.18 |
| 1.0 | 1.35 | 1.21 | 1.28 | 1.23 | 10 | 1.25 |
| 1.6 | 1.58 | 1.21 | 1.43 | 1.23 | 15 | 1.35 |
| 2.0 | 1.83 | 1.45 | 1.61 | 1.50 | 20 | 1.47 |
| 2.5 | 5.00 | 1.63 | 1.98 | 1.50 | 30 | 1.70 |
| 3.0 | 6.84 | 1.97 | 3.92 | 2.15 | 40 | 1.98 |
| 4.0 | ------ | 5.30 | 5.96 | 5.46 | 50 | 2.52 |
| 5.0 | ------ | 5.79 | 6.07 | 5.89 | 60 | 3.21 |
| | | | | | 70 | 3.68 |
| | | | | | 80 | 4.07 |
| | | | | | 90 | 4.60 |
| | | | | | 100 | 4.62 |

Employing the Time Neutralization Test of Cornell, Gastroenterology, vol. 31, No. 4 pages 505 to 510 (1956), wherein to 50 milliliters of 0.1 N HCl are added 0.5 gram of each of the antacids to be evaluated, and the pH taken at six (6) minute intervals for a period of one hour, it has also been demonstrated that the preferred urea-calcium carbonate composition described above held a more stable pH than did the glycine-calcium carbonate composition (Formula C) of the foregoing table. Employing the procedure of Dale and Booth (Journal of the Pharmaceutical Association, volume 44, No. 3, page 170, 1955) both of the compositions of Examples 1 and 2 showed a prolonged buffering action of from twenty to forty (20–40) minutes over that shown by calcium carbonate.

EXAMPLE 3

A powder mixture was prepared consisting of 75 grams of glycine, 75 grams of urea, 350 grams of calcium carbonate and 35 grams of starch. A paste was then prepared consisting of 17 grams of starch and 2.5 grams of gelatin, in which were dissolved 3 grams of soluble saccharin. The latter paste was added to the powder mixture, mixed, and the resulting mixture was then granulated in a wet granulator, and finally dried at 125° F. The dried granulation product was passed through an oscillator sieve having a No. 10 screen, and 2 grams of spearmint oil, 37.5 grams of starch and 7.55 grams of magnesium stearate were added thereto. The resulting preparation was mixed in a ribbon mixer and then compressed to form approximately 1000 easily chewable, pleasant tasting tablets containing 75 milligrams of glycine, 75 milligrams of urea and 350 milligrams of calcium carbonate in a total of approximately 605 milligrams.

EXAMPLE 4

A powder mixture was prepared consisting of 150 grams of urea, 350 grams of calcium carbonate and 35 grams of starch. A paste was then prepared containing 17 grams of starch and 2.5 grams of gelatin, in which were dissolved 3.5 grams of soluble saccharin. The resulting paste was added to the powder mixture, mixed, and the resulting mixture was then granulated in a wet granulator, and finally dried at 125° F. The dried granulation product was passed through an oscillator sieve having a No. 10 screen, and thereafter, 2 grams of spearmint oil, 37.5 grams of starch and 7.55 grams of magnesium stearate were added thereto. The resulting preparation was mixed in a ribbon mixer and compressed to provide approximately 1000 easily chewable, pleasant tasting tablets containing 150 milligrams of urea and 350 milligrams of calcium carbonate in a total weight of approximately 605 milligrams.

Having thus described the subject matter of our invention, what it is desired to secure by Letters Patent is:

1. An antacid composition that comprises from 15 parts to 40 parts by weight of urea, 60 parts to 85 parts by weight of calcium carbonate, and from 0 to 15 parts by weight of glycine.

2. An antacid composition that comprises 30 parts by weight of urea and 70 parts by weight of calcium carbonate.

3. The process that comprises orally administering to a human being an antacid composition in unit dosage form composed of from 15 parts to 40 parts by weight of urea, 60 parts to 85 parts by weight of calcium carbonate and from 0 to 15 parts by weight of glycine.

4. The process that comprises orally administering to a human being an antacid composition in unit dosage form composed of 30 parts by weight of urea and 70 parts by weight of calcium carbonate.

5. A solid antacid composition in tablet unit-dosage form that comprises, based on the total weight of active ingredients, from 15 parts to 40 parts by weight of urea, 60 parts to 85 parts by weight of calcium carbonate, and from 0 to 15 parts by weight of glycine.

6. A solid antacid composition in tablet unit-dosage form that comprises, based on the total weight of active ingredients, from 60 to 85 parts by weight of calcium carbonate and from 15 to 40 parts by weight of urea.

7. A solid antacid composition in tablet unit-dosage form that comprises, based on the total weight of active ingredients, 30 parts by weight of urea and 70 parts by weight of calcium carbonate.

8. A liquid antacid composition that comprises, based on the total weight of active ingredients, from 15 parts to 40 parts by weight of urea, 60 parts to 85 parts by weight of calcium carbonate, from 0 to 15 parts by weight of glycine, and a suitable liquid carrier medium.

9. A liquid antacid composition that comprises, based on the total weight of active ingredients, 30 parts by weight of urea, 70 parts by weight of calcium carbonate, and a suitable liquid carrier medium.

References Cited in the file of this patent

UNITED STATES PATENTS 2,429,596   Abramson _____ Oct. 28, 1947
2,840,506   Goodfriend _____ June 24, 1958